(12) United States Patent  
Honjo

(10) Patent No.: US 7,013,077 B2  
(45) Date of Patent: Mar. 14, 2006

(54) SIGNAL PROCESSING METHOD AND APPARATUS

(75) Inventor: Masahiro Honjo, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 1093 days.

(21) Appl. No.: 09/797,823

(22) Filed: Mar. 5, 2001

(65) Prior Publication Data

US 2001/0033737 A1 Oct. 25, 2001

(30) Foreign Application Priority Data

Mar. 3, 2000 (JP) .............................. 2000-058433

(51) Int. Cl.
*H04N 5/91* (2006.01)
*H04N 7/08* (2006.01)
*G11B 5/86* (2006.01)

(52) U.S. Cl. .............................. 386/92; 386/46; 360/15

(58) Field of Classification Search ................. 386/92, 386/95, 109, 111, 112, 27, 33, 105, 106, 124, 386/125, 45, 46, 40, 60, 65, 52, 1, 94; 360/4, 360/32, 15, 13
See application file for complete search history.

(56) References Cited

U.S. PATENT DOCUMENTS 5,325,238 A * 6/1994 Stebbings et al. ............ 360/15
6,185,366 B1 * 2/2001 Sugahara .................... 386/112

FOREIGN PATENT DOCUMENTS

JP  9-121368  5/1997

* cited by examiner

*Primary Examiner*—Robert Chevalier
(74) *Attorney, Agent, or Firm*—Wenderoth, Lind & Ponack, L.L.P.

(57) ABSTRACT

A signal processing apparatus monitors the dubbing state at a higher-speed dubbing of digital video data or audio data. The signal processing apparatus includes a first storage device containing an MPEG system stream as digital data, a second storage device containing an MPEG system stream as the digital data, and a decoder unit for carrying out a decoding process for the digital data read from the first storage device. The decoder unit is constructed to carry out a discrete decoding process for decoding the system stream as digital data transferred from the first storage device to the second storage device at a higher rate than the normal playback transfer rate.

19 Claims, 6 Drawing Sheets

SIGNAL PROCESSING METHOD AND APPARATUS

FIELD OF THE INVENTION

The present invention relates to a signal processing method and apparatus and, more particularly, to signal processing for dubbing digital video data or digital audio data at a high speed.

BACKGROUND OF THE INVENTION

Conventionally, there are audio devices such as cassette tape recorders as apparatus for recording and playing back analog audio signals, and there are video tape recorders as apparatus for recording and playing back analog video signals.

There are some conventional analog audio devices, such as cassette tape recorders, which have an operation mode of dubbing an analog audio signal recorded on a magnetic tape at a double-speed of the tape speed at the normal playback. In these analog audio devices, the playback audio is also output at the double-speed dubbing, whereby monitoring of the dubbing state is made possible.

In the existing videotape recorder (VTR), a played-back analog video signal is output to the video output terminal in the playback state such that an analog video signal recorded on the magnetic tape is played back. Thus, the video output terminal of the first VTR is connected to the video input terminal of the second VTR, whereby the analog video signal is played back by the first VTR while the played-back analog video signal is recorded by the second VTR. That is, the dubbing of the analog video signal can be performed with monitoring the state of the dubbing.

However, this dubbing of the analog video signal using two VTRs is possible only at the normal playback speed and impossible at a higher speed than the normal playback speed. For example, the analog video signal can be played back at a higher speed on the playback end VTR, but the analog video signal cannot be recorded at a higher speed on the record end VTR.

Further, in recent years, record/playback apparatuses such as MD recorders for digital audio data or record/playback apparatuses such as DVD recorders for digital video data have been put to practical use.

In these record/playback apparatuses for the digital data, the digital data can be reproduced without the decline in the sound quality or image quality. Thus, it is considered that in these record/playback apparatuses, the storage or edition of image or sound information will be increasingly performed in the format of digital data.

Accordingly, record/playback apparatuses which are obtained by mounting a storage device for digital data such as a hard disk drive on the DVD recorders are also intended to be put to practical use.

FIG. 6 is a block diagram schematically illustrating a record/playback apparatus which is obtained by mounting a hard disk in the DVD recorder.

The record/playback apparatus 10 as shown in FIG. 6 has a hard disk 10a as a large-capacity data storage medium, an optical disk drive 10b for performing data access to an optical disk, an interface unit 10c for a display unit 20 outside the record/playback apparatus, and a signal processing unit 10d for performing digital data access to the hard disk 10a, the optical disk drive 10b and the interface unit 10c, as well as performing various processes for the digital data such as decoding.

In the hard disk 10a, various types of digital data are stored, and, for example, digital video data are coded and stored as a video stream. The signal processing unit 10d performs, as signal processing for digital data, the data transfer process for reading a video stream Sv from the hard disk 10a and supplying the video stream Sv to the optical disk drive 10b, and the decoding process for reading the video stream Sv from the hard disk 10a, decoding the read video stream, and outputting decoded data to the interface unit 10c and the like. The interface unit 10c converts the digital video data Dv obtained by the decoding of the video stream in the signal processing unit 10d into analog video data Av, and supplies the analog video data Av to the display unit 20.

Next, a case where the display and dubbing of digital video data is performed using the so-constructed record/playback apparatus will be briefly described.

When the display of the digital video data is to be performed by the record/playback apparatus 10, initially the video stream Sv is read from the hard disk 10a to the signal processing unit 10d. Then, the readout video stream Sv is decoded by the signal processing unit 10d, and digital video data Dv obtained by the decoding of the video stream Sv are output to the display unit 20 as the analog video data Av via the interface unit 10c. In this case, the average data transfer rate at which the video stream Sv is transferred from the hard disk 10a to the signal processing unit 10d is the normal transfer rate corresponding to the normal playback process in cases where the display of the digital video data is performed.

When the dubbing of the video stream Sv is performed, the video stream Sv is read from the hard disk 10a to the signal processing unit 10c, and the read video stream Sv is supplied to the optical disk drive 10b. Then, in the optical disk drive 10b, a process for writing the video stream Sv on an optical disk is carried out. In this case, the transfer rate of data (video stream) to be transferred from the hard disk 10a to the signal processing unit 10d, in other words, the transfer rate of data to be transferred from the hard disk 10a to the optical disk drive 10b corresponds to the data writing ability of the optical disk drive 10b and generally is a high-speed transfer rate, such as twice, four times or eight times as high as the normal transfer rate.

In the description of FIG. 6, the case where the video stream Sv is transferred from the hard disk 10a to the optical disk drive 10b is shown. However, when the video stream Sv is transferred from the hard disk 10a to another hard disk, the transfer rate of the video stream Sv is much higher than in the case where the video stream is transferred to the optical disk drive 10b.

In the record/playback apparatus 10, the display of digital image data or dubbing of a video stream can be performed, but the display of digital image data while performing the dubbing of the data cannot be performed, whereby the state of the dubbing cannot be monitored.

This is for the following reasons. The decoding of coded digital video data (video stream) is performed at a data processing speed corresponding to the data transfer rate at the normal playback. On the other hand, when the dubbing of the video stream is performed, data access to record media such as a hard disk is performed at a higher speed than the data transfer rate at the normal playback. Therefore, the decoding process corresponding to the data transfer rate at the normal playback cannot be simply applied to data (video stream) at the time of dubbing, which are accessed at a higher data transfer rate than the data transfer rate at the normal playback.

For example, also when digital video data which have been coded in a variable rate coding process corresponding to the MPEG (Moving Picture Experts Group) standard, typified by data recorded on a DVD (Digital Video Disk), are dubbed, the dubbing of the digital video data is performed at a higher average transfer rate than the average transfer rate required for the normal playback. Therefore, also in this case, the decoding of the coded digital video data (video stream) cannot be performed in parallel with the dubbing of the data and thereby the state of the dubbing cannot be monitored.

The above-mentioned problem that the dubbing state cannot be monitored at the time of high-speed dubbing is not confined to the digital video data, but the similar problem occurs in the case of digital audio data. That is, also when the high-speed dubbing of coded digital audio data is performed, it is impossible to decode the data and monitor the audio accurately.

SUMMARY OF THE INVENTION

It is an object of the present invention to provide a signal processing method and apparatus which can monitor the dubbing state when high-speed dubbing of digital video data or digital audio data is performed.

Other objects and advantages of the present invention will become apparent from the detailed description and specific embodiments described are provided only for illustration since various additions and modifications within the spirit and scope of the invention will be apparent to those of skill in the art from the detailed description.

A signal processing method according to a 1st aspect of the present invention which includes a dubbing process for dubbing coded data including at least one of digital video information and digital audio information, comprises: a first signal processing step of carrying out a data reading process for reading the coded data from a first storage medium which contains the coded data, at a second average transfer rate which is higher than a first average transfer rate as an average transfer rate required for normal playback of the information; and a second signal processing step of carrying out a data writing process for writing the coded data read from the first storage medium onto a second storage medium at the second average transfer rate, as well as carrying out a decoding process for decoding at least part of the coded data, and repeatedly carrying out a data output process for discretely outputting decoded data obtained by the decoding process so that the output of the decoded data is not interrupted. Therefore, at the high-speed dubbing of the coded digital video data or digital audio data, the dubbing state can be monitored.

According to a 2nd aspect of the present invention, in the signal processing method of the 1st aspect, the coded data are obtained by coding a digital video signal by a variable rate coding process in which a generated code amount per unit time varies with complexities of images, and the second signal processing step is carried out for outputting a digital video signal as the decoded data. Therefore, also at the high-speed dubbing of the coded data obtained by coding the digital video signal by the variable rate coding process of MPEG method, the dubbing state can be monitored.

According to a 3rd aspect of the present invention, in the signal processing method of the 2nd aspect, the variable rate coding process includes an intra-picture coding process for subjecting a target picture, as a frame or field to be coded, to a coding process for a digital video signal without referring to other pictures as other frames or fields, and an inter-picture prediction coding process for subjecting a target picture, as a frame or field to be coded, to a coding process for a digital video signal with referring to other pictures as other frames or fields, and the second signal processing step is carried out for discretely outputting a decoded video signal for at least a part of plural pictures which have been subjected to the intra-picture coding process, the signal being obtained by the decoding process for the coded data, and at this time holding an output state of a decoded video signal corresponding to one picture until a decoded video signal corresponding to the next picture is output. Therefore, also at the high-speed dubbing of the video data which have been subjected to the variable rate coding process of the MPEG method, the monitor image can be displayed without interruption.

According to a 4th aspect of the present invention, in the signal processing method of the 2nd aspect, the variable rate coding process includes an intra-picture coding process for subjecting a target picture, as a frame or field to be coded, to a coding process for a digital video signal without referring to other pictures as other frames or fields, and an inter-picture prediction coding process for subjecting a target picture, as a frame or field to be coded, to a coding process for a digital video signal with referring to a previous picture as other frame or field situated forward the target frame on a time axis, and the second signal processing step comprises discretely outputting a decoded video signal for at least a part of plural pictures which have been subjected to the intra-picture coding process or the inter-picture prediction coding process, the signal being obtained by the decoding process for the coded data, while holding an output state of a decoded video signal corresponding to one picture until a decoded video signal corresponding to the next picture is output. Therefore, also at the high-speed dubbing of the video data which have been subjected to the variable rate coding process of the MPEG method, the monitor image can be displayed smoothly and without interruption.

According to a 5th aspect of the present invention, in the signal processing method of the 4th aspect, the second signal processing step comprises switching between a first decoding process for subjecting only pictures which have been subjected to the intra-picture coding process to the decoding process for the coded data, and a second decoding process for subjecting pictures which have been subjected to the intra-picture coding process or the inter-picture prediction coding process to the decoding process for the coded data, according to the generated code amount of the coded data per unit time. Therefore, when the coded data corresponding to a complex image are dubbed, the resolution per hour of an image displayed as the monitor image of the dubbing state is increased, and when the coded data corresponding to a simple image are dubbed, the resolution per hour of an image displayed as the monitor image is reduced. Accordingly, during the dubbing of the coded data corresponding to the complex image, the image whose motion is smooth can be displayed as the monitor image, and for the simple image, a much higher-speed dubbing of the coded data can be executed.

According to a 6th aspect of the present invention, in the signal processing method of the 2nd aspect, the second signal processing step comprises carrying out the decoding process for the coded data taking at least one group of pictures including plural pictures as frames or fields as a unit, outputting decoded image signals corresponding to pictures composing at least one group of pictures as one continuous decoded video signal, and holding an output state of a decoded video signal corresponding to a last picture of the continuous decoded video signal until a decoded video signal corresponding to a first picture of the next continuous decoded video signal is output. Therefore, also at the high-speed dubbing of video data which have been subjected to the variable rate coding process of the MPEG method, a process for displaying an image continuously over a prescribed number of frames can be carried out intermittently with avoiding the interruption of the display of images.

According to a 7th aspect of the present invention, in the signal processing method of the 2nd aspect, the second average transfer rate is approximately equal to a maximum coding rate in the variable rate coding process of MPEG method. Therefore, for example, in the case of DVD (digital video disk), the relative speeds of the first storage medium (data magnetic tape) to the playback head are set approximately equal at the normal playback and the high-speed dubbing. Accordingly, the system construction of the DVD (digital video disk) becomes simpler.

According to an 8th aspect of the present invention, in the signal processing method of the 2nd aspect, the second average transfer rate is a transfer rate which is higher than a maximum coding rate in the variable rate coding process of MPEG method. Therefore, for example, in the case of dubbing from a hard disk to a hard disk, the data transfer rate at the dubbing is enhanced to a great extent as compared to the normal playback, whereby an extremely higher-speed dubbing can be performed.

According to a 9th aspect of the present invention, in the signal processing method of the 1st aspect, the coded data are obtained by coding a digital audio signal, and the second signal processing step comprises outputting a digital audio signal as the decoded data. Therefore, when performing the high-speed dubbing for the coded data obtained by coding digital audio data, the audio dubbing state can be monitored.

According to a 10th aspect of the present invention, in the signal processing method of the 9th aspect, the second signal processing step comprises repeatedly carrying out an intermittent audio decoding process for executing the decoding process for the coded data for a first prescribed period and skipping the decoding process for the coded data for a second prescribed period following the first prescribed period, and repeatedly carrying out a data output process for outputting the decoded data during the first prescribed period and the following second prescribed period, with taking a digital audio signal obtained by the decoding process for the first prescribed period as a unit. Therefore, also at the high-speed of the coded digital audio data, the dubbing state of the audio data can be monitored with the sound quality approximate to that at the normal playback.

According to an 11th aspect of the present invention, in the signal processing method of the 1st aspect, the second signal processing step comprises generating auxiliary information indicating a data writing position at which the coded data are written onto the second storage medium in accordance with an operation signal generated by the user operation, and writing the auxiliary information onto the second storage medium together with the coded data. Therefore, the information indicating the position of data desired by the user in the coded data during the dubbing can be easily extracted by the user after the dubbing.

According to a 12th aspect of the present invention, in the signal processing method of the 1st aspect, the second signal processing step comprises generating positional information indicating a data writing position at which the coded data are written onto the second storage medium or time information indicating a data writing time corresponding to the data writing position, in accordance with an operation signal generated by the user operation, and storing the positional information or time information as auxiliary information in a management information storage area in the second storage medium, in which management information of storage target data is stored. Therefore, the information indicating the position of data desired by the user in the coded data during the dubbing can be easily extracted by the user after the dubbing.

According to a 13th aspect of the present invention, in the signal processing method of the 12th aspect, the second signal processing step comprises compensating the positional information indicating the data writing position at the user operation time or time information indicating the data writing time so that this information indicates a previous data writing position at which the writing onto the storage medium was performed a predetermined time before the user operation time, or a data writing time corresponding to the previous data writing position, and storing the compensated positional information or time information in the second storage medium. Therefore, after the dubbing, the data desired by the user can be extracted accurately and easily.

According to a 14th aspect of the present invention, in the signal processing method of the 1st aspect, a hard disk, an optical disk, a magneto-optical disk, a semiconductor memory or a magnetic tape is used as the first storage medium; and a hard disk, an optical disk, a magneto-optical disk, a semiconductor memory or a magnetic tape is used as the second storage medium. Therefore, also at a high-speed dubbing from a tape or disk medium to a disk medium, a semiconductor memory medium or a tape medium, the dubbing state can be monitored.

A signal processing apparatus according to a 15th aspect of the present invention which carries out a dubbing process for dubbing coded data including at least one of digital video information and digital audio information, at a second average transfer rate which is higher than a first average transfer rate as an average transfer rate required for normal playback of the information, comprises: a data writing unit for writing the coded data read at the second average transfer rate from a first storage medium containing the coded data, onto a second storage medium at the second average transfer rate; and a decoder unit for carrying out a decoding process for decoding at least part of the coded data read at the second average transfer rate from the first storage medium, as well as repeatedly carrying out a data output process for discretely outputting decoded data obtained by the decoding process so that the output of the decoded data is not interrupted. Therefore, at the high-speed dubbing of coded digital video data or digital audio data, the dubbing state can be monitored.

A signal processing apparatus according to a 16th aspect of the present invention which carries out a signal processing for dubbing coded data including at least one of digital video information and digital audio information, at a second average transfer rate which is higher than a first average transfer rate as an average transfer rate required for normal playback of the information, comprises: a data reading unit for reading the coded data from a first storage medium containing the coded data at the second average transfer rate; and a data output unit for carrying out a decoding process for decoding at least part of the coded data read from the first storage medium at the second average transfer rate and repeatedly carrying out a data output process for discretely outputting decoded data obtained by the decoding process so that the output of the decoded data is not interrupted.

Therefore, at the high-speed dubbing of coded digital video data or digital audio data, the dubbing state can be monitored.

BRIEF DESCRIPTION OF THE DRAWINGS

FIG. 1(a) shows an entire structure of the signal processing apparatus and FIG. 1(b) shows a structure of a decoder unit in the signal processing apparatus.

FIG. 2(a) shows an arrangement of frames composing an image sequence Im on a time axis, FIG. 2(b) shows an arrangement of coded data of the frames in a video stream and FIG. 2(c) shows the relation between a GOP and a frame in the video stream.

FIG. 5(a) shows a structure of a decoder unit in the signal processing apparatus and FIG. 5(b) shows how the decoding mode is switched by the decoder unit.

DETAILED DESCRIPTION OF THE PREFERRED EMBODIMENTS

Figure 1:
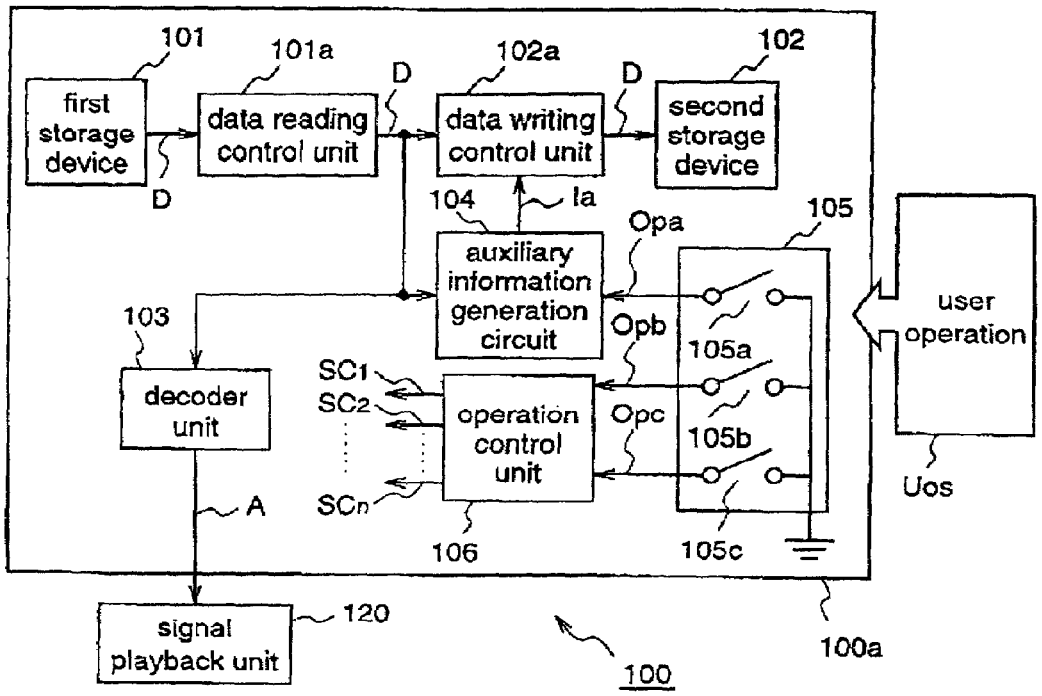
FIGS. 1(a) and 1(b) are block diagrams for explaining a signal processing apparatus according to a first embodiment of the present invention.
Figure 1:
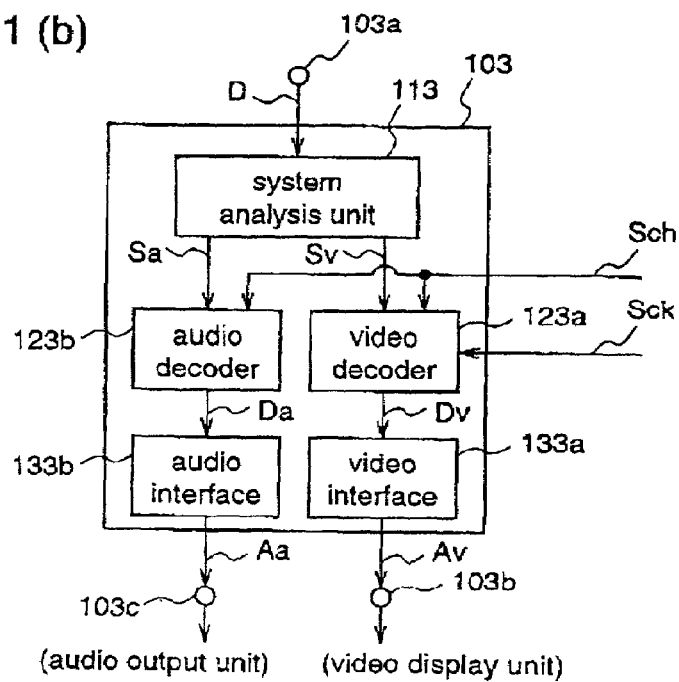

Hereinafter, embodiments of the present invention will be described.

Embodiment 1

FIGS. 1(a) and 1(b) are block diagrams for explaining a signal processing apparatus according to the first embodiment. FIG. 1(a) shows a signal processing apparatus and FIG. 1(b) shows a decoder unit in the signal processing apparatus.

The signal processing apparatus 100 of the first embodiment has a first storage device 101 for storing digital data D, a data reading control unit 101a for controlling the first storage device 101 to read digital data D from a storage medium of the device 101 and outputting the readout digital data D, a second storage device 102 for storing the digital data D, and a data writing control unit 102a for controlling the second storage device 102 and writing the digital data D output from the data reading control unit 101a to a storage medium of the second storage device 102.

The first storage device 101 is a hard disk drive (HDD) for performing an access (recording and reading) of the digital data D to a hard disk (first storage medium), and the second storage device 102 is an optical disk drive for recording the digital data D into an optical disk (second storage medium).

The signal processing apparatus 100 has a decoder unit 103 for decoding the digital data D output from the data reading control unit 101a, as well as converting the decoded digital data into an analog signal A and outputting the analog signal A to a signal playback unit 120, and an auxiliary information generation circuit 104 for generating auxiliary information Ia for indicating a writing address of data transferred from the first storage device 101 to the second storage device 102 in accordance with a user operation signal Opa. When the auxiliary information Ia generated by the auxiliary information generation circuit 104 is input to the data writing control unit 102a, the control unit 102a controls the second storage device 102 so that the auxiliary information Ia is written onto a management, area of the storage medium (optical disk).

The signal processing apparatus 100 has an operation control unit 106 for receiving user operation signals Opb and Opc and controlling the operations of the data reading control unit 101a, the data writing control unit 102a, the decoder unit 103 and the like with control signals Sc1, Sc2, . . . , Scn, and a user operation unit 105 having switches 105a~105c and generating the operation signals Opa~Opc in accordance with the user's switch operation Uos.

Here, the respective elements 101, 101a, 102, 102a, 103~106 are contained in one apparatus body 100a. On the storage medium of the first storage device 101, a multiplex bitstream including a video stream which is obtained by coding digital video data of a predetermined image sequence by a variable rate coding method based on MPEG is recorded as digital data. In addition, in this multiplex bitstream, not only the video stream but also an audio stream which is obtained by coding digital audio data composing the predetermined image sequence together with the digital video data is included. Here, the variable rate coding processing is a coding method which subjects data corresponding to a simple image to a coding process generating a smaller amount of codes per hour (low rate coding process), and subjects data corresponding to a complicated image to a coding process generating a larger amount of codes per hour (high rate coding process).

The signal processing apparatus 100 has following first to fourth operation modes as its operation mode.

The first operation mode is a normal playback mode for playing back digital video data and digital audio data on the basis of the multiplex bitstream stored in the first storage device 101, and performing image display and audio output. The second operation mode is a double-speed mode for carrying out a double-speed dubbing of the multiplex bitstream with monitoring the dubbing state. The third operation mode is a quintuple-speed dubbing mode for carrying out a quintuple-speed dubbing of the video stream with monitoring the dubbing state. The fourth operation mode is a 15×-speed dubbing mode for carrying out a 15×-speed dubbing of the video stream with monitoring the dubbing state. In the second to fourth operation modes, during the dubbing of the video stream, the display of a monitor image is performed discretely in frame units and the output of monitor audio is performed discretely in units of plural frames.

The selection among these operation modes is made by the manipulation of the switches in the user operation unit 105. The operation control unit 106 controls the data reading control unit 101a, the data writing control unit 101b and the decoder unit 103 so as to perform the operations according to each operation mode, in accordance with the operation signal Opb from the user operation unit 105.

Hereinafter, the video stream according to MPEG is briefly described.

Figure 2:
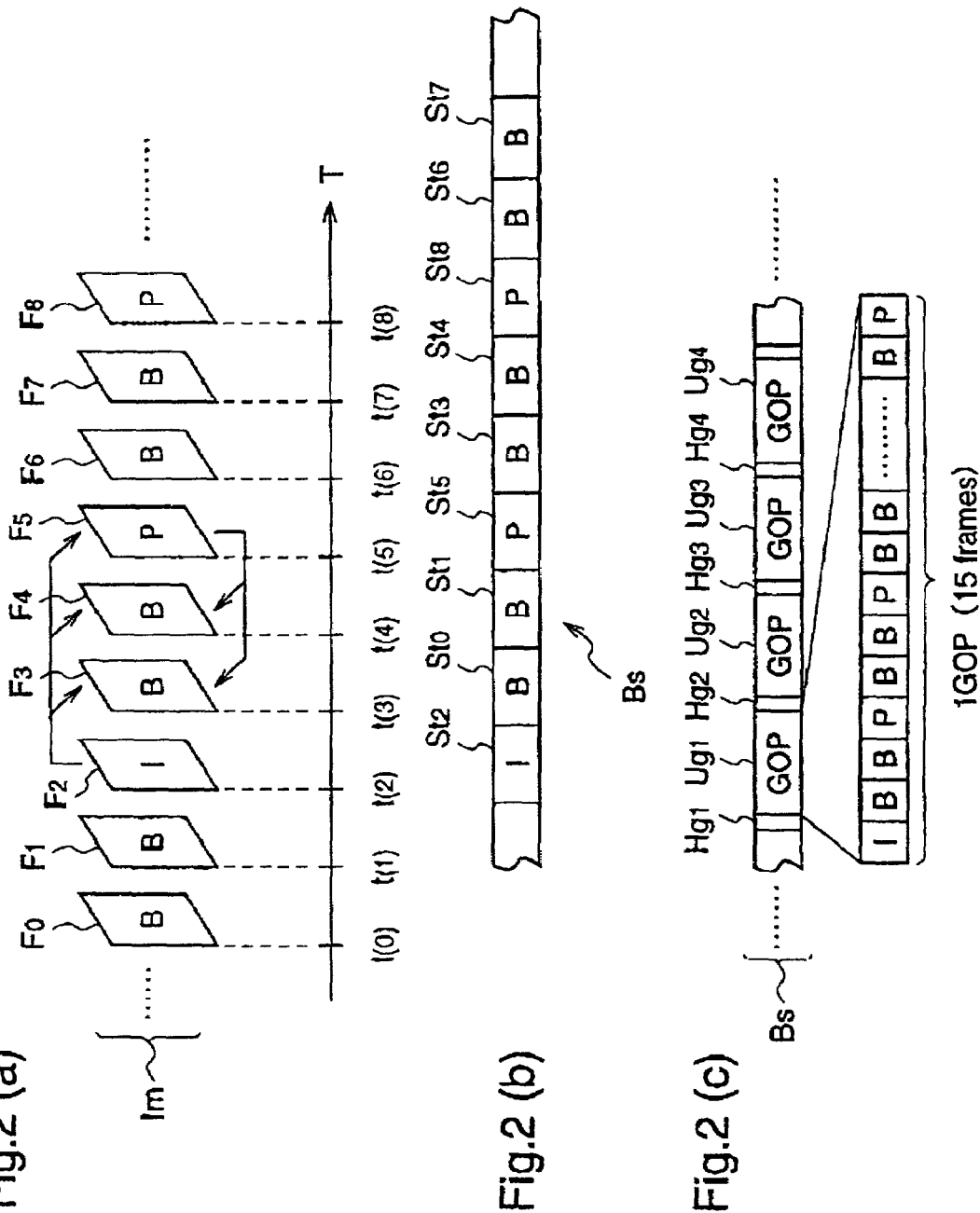
FIGS. 2(a) to 2(c) are diagrams for explaining coded data (video stream) to be processed by the signal processing apparatus of the first embodiment.

Frames composing one image sequence Im, for example, F0~F8, are placed on a time axis T as shown in FIG. 2(*a*). The display times t(0)~t(8) [t(n)<t(n+1) (n: integer from 0 to 7] at which the respective frames are to be displayed are, for example, set for the frames F0~F8, respectively, as time information.

In the coding method conforming to MPEG, an intra coding for coding image data corresponding to a target frame to be coded without referring to image data of other frames and an inter coding for coding image data corresponding to a target frame with referring to image data of other frames are switched under a prescribed rule. The inter coding includes a forward prediction coding in which image data of a frame which is situated forward on the time axis with respect to a coding target frame (previous frame) are referred to, and a bidirectional prediction coding in which image data of frames which are situated forward and backward on the time axis with respect to a coding target frame, i.e., image data of a previous frame and a subsequent frame, are referred to.

To be more specific, frame F2 is a frame which is obtained by subjecting the image data to the intra-frame coding processing (I frame), frames F5 and F8 are frames which are obtained by subjecting the image data to the forward prediction coding (P frames), and frames F0, F1, F3, F4, F6 and F7 are frames which are obtained by subjecting the image data to the bidirectional prediction coding (B frames).

The P frame F5 is the one which has been subjected to the forward prediction coding using the I frame F2 situated forward thereof as a reference frame, and the B frames F3 and F4 are the ones which have been subjected to the bidirectional prediction coding using the I frame F2 situated forward thereof and the P frame F5 situated backward thereof as reference frames, respectively.

Coded data St0~St8 of the frames F0~F8 which are obtained by the coding for the image data of the respective frames are arranged in a video stream Bs, corresponding to one image sequence Im, in a different order from the arrangement order of the frames on the time axis T, as shown in FIG. 2(*b*).

That is, coded data of two B frames are placed between coded data of I frame and coded data of P frame which are adjacent each other or coded data of two adjoining P frames. However, since the image data of B frame are coded with referring to image data of P frame situated backward thereof or I frame, in other words on the decoding end, the coded data of B frame are decoded with reference to decoded data of P frame which is situated backward thereof or I frame, the arrangement order of the coded data of the frames in the video stream is different from the arrangement of the frames on the time axis of the image sequence, and coded data of each B frame are placed subsequent to coded data of two reference frames of the B frame.

To be more specific, between the coded data St2 of the I frame F2 and the coded data St5 of the P frame F5, not the coded data St3 and St4 of the B frames F3 and F4, but the coded data St0 and St1 of the B frames F0 and F1 are placed.

Then, the video stream Bs has a data structure in which coded data of the frames are divided into data units (GOP: group of picture) every 15 frames, each GOP having header information (see FIG. 2(*c*)). For example, to data units Ug1~Ug4, the corresponding header information Hg1~Hg4 are added, respectively. Here, the data unit (GOP) is a random access unit of coded data. The header information includes accessory information of frames included in a GOP, as the random access unit, other than the image information.

Next, a concrete structure of the decoder unit 103 in the signal processing apparatus 100 will be briefly described with reference to FIG. 1(*b*).

This decoder unit 103 has a system analysis unit 113 for analyzing a multiplex bitstream (system stream of MPEG) input to an input terminal 103*a* as digital data D and separating a video stream Sv and an audio stream Sa from the multiplex bitstream to output the video stream Sv and the audio stream Sa, a video decoder 123*a* for carrying out a video decoding process of decoding the video stream Sv output from the system analysis unit 113 on the basis of the analysis result and outputting decoded data (digital video data) Dv obtained by the video decoding process, and an audio decoder 123*b* for carrying out an audio decoding process of decoding the audio stream Sa output from the system analysis unit 113 on the basis of the analysis result and outputting decoded data (digital audio data) Da obtained by the audio decoding process. In addition, the decoder unit 103 has a video interface 133*a* for converting the digital video data Dv output from the video decoder 123*a* into an analog video signal Av and outputting the analog video signal Av to an output terminal 103*b*, and an audio interface 133*b* for converting the digital audio data Da output from the audio decoder 123*b* into an analog audio signal Aa and outputting the analog audio signal Aa to an output terminal 103*c*. The analog video signal Av output to the output terminal 103*b* is played back in the video display unit of the signal playback unit 120 and the image display is performed. The analog audio signal Aa output to the output terminal 103*c* is supplied to the audio output unit of the signal playback unit 120 and the playback audio is output from the audio output unit.

The video decoder 123*a* and the audio decoder 123*b* in the decoder unit 103 are constituted so as to perform the decoding process according to the first to fourth operation modes in accordance with a control signal Sch from the operation control unit 106. Further, in the dubbing mode (second to fourth operation modes), the video decoder 123*a* selects one of a first decoding mode (I image decoding mode) for decoding only I frames, and a second decoding mode (IP image decoding mode) for decoding only I frames and P frames, in accordance with a control signal Sck from the operation control unit 106.

The control signals Sch and Sck are generated by the operation control unit 106 in accordance with the operation signals Opb and Opc generated by the user operation Uos to the switches 105*b* and 105*c* in the user operation unit 105, respectively.

Hereinafter, structures of the decoders 123*a* and 123*b* are specifically described.

Figure 3:
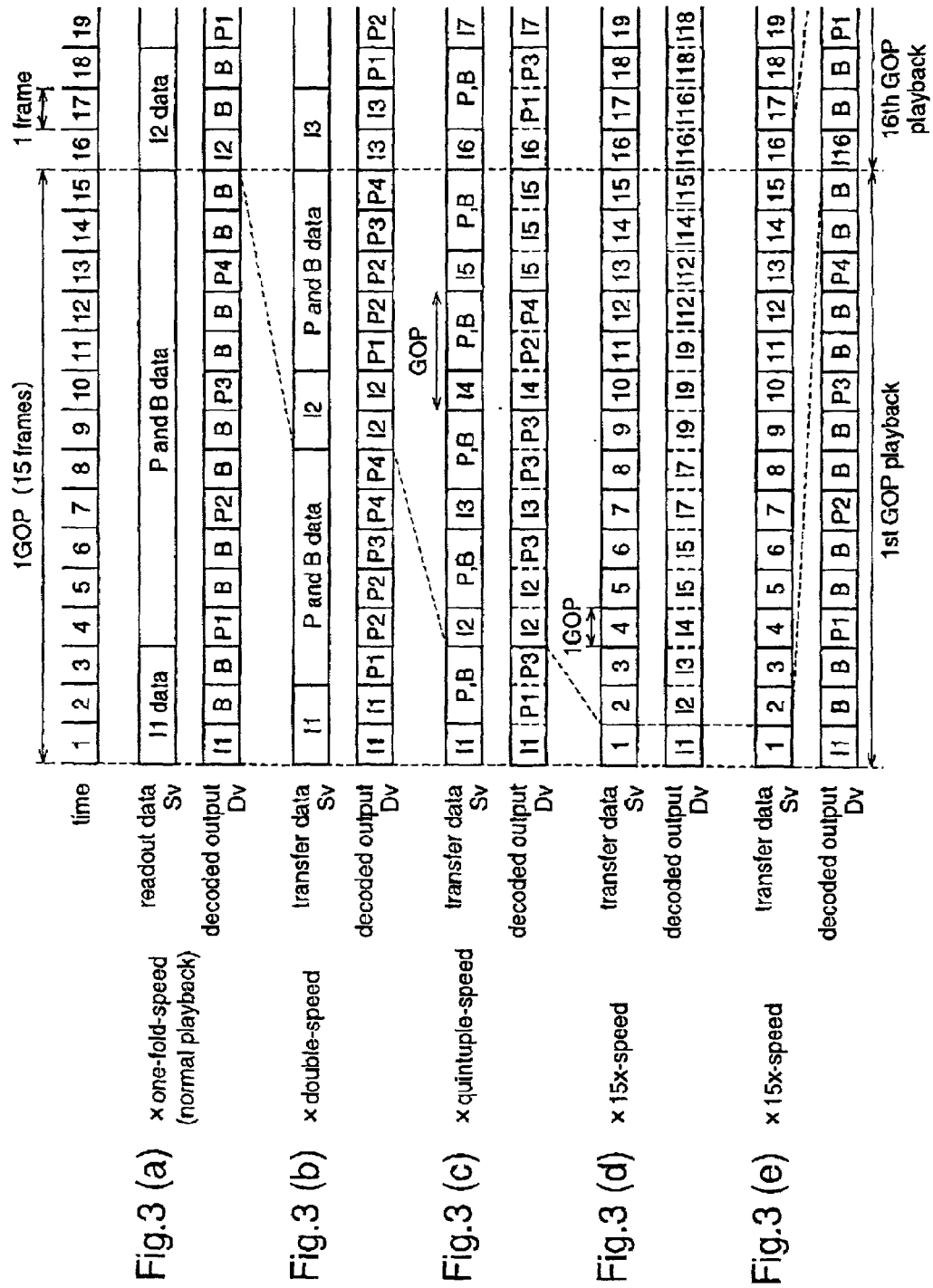
FIGS. 3(a) to 3(e) are diagrams for explaining decoding output processes of a video stream by the decoder unit of the signal processing apparatus according to the first embodiment, and show target frames to be decoded and output in a normal playback mode (FIG. 3(a)), a double-speed dubbing mode (FIG. 3(b)) and high-speed dubbing modes (FIGS. 3(c), 3(d) and 3(e)).

FIGS. 3(*a*)~3(*e*) are schematic diagrams for explaining a decoding process for the video stream by the video decoder 123*a*, and these figures show how to thin out target frames to be decoded at the dubbing. To be more specific, FIGS. 3(*a*)–3(*e*) show the state where a video stream is decoded in frame units or GOP units in the normal playback mode (FIG. 3(*a*)), the double-speed dubbing mode (FIG. 3(*b*)), and the high-speed dubbing modes (FIGS. 3(*c*) and 3(*d*)). An intra-frame coded data (I data) are situated at the top of a GOP. Normally, there is a delay time of several frames from when transfer data are input to the decoder unit until decoded data (decoded output) are output from the decoder unit, i.e., the decoded data (decoded output) of I frame (I1) are output after the transfer of the video stream of I frame (I1 data) to the decoder unit is completed. However, in the FIGS. 3(a)–3(e), for convenience of the description, the transfer start time of the transfer data and the output start time of the decoded data are matched.

Figure 4:
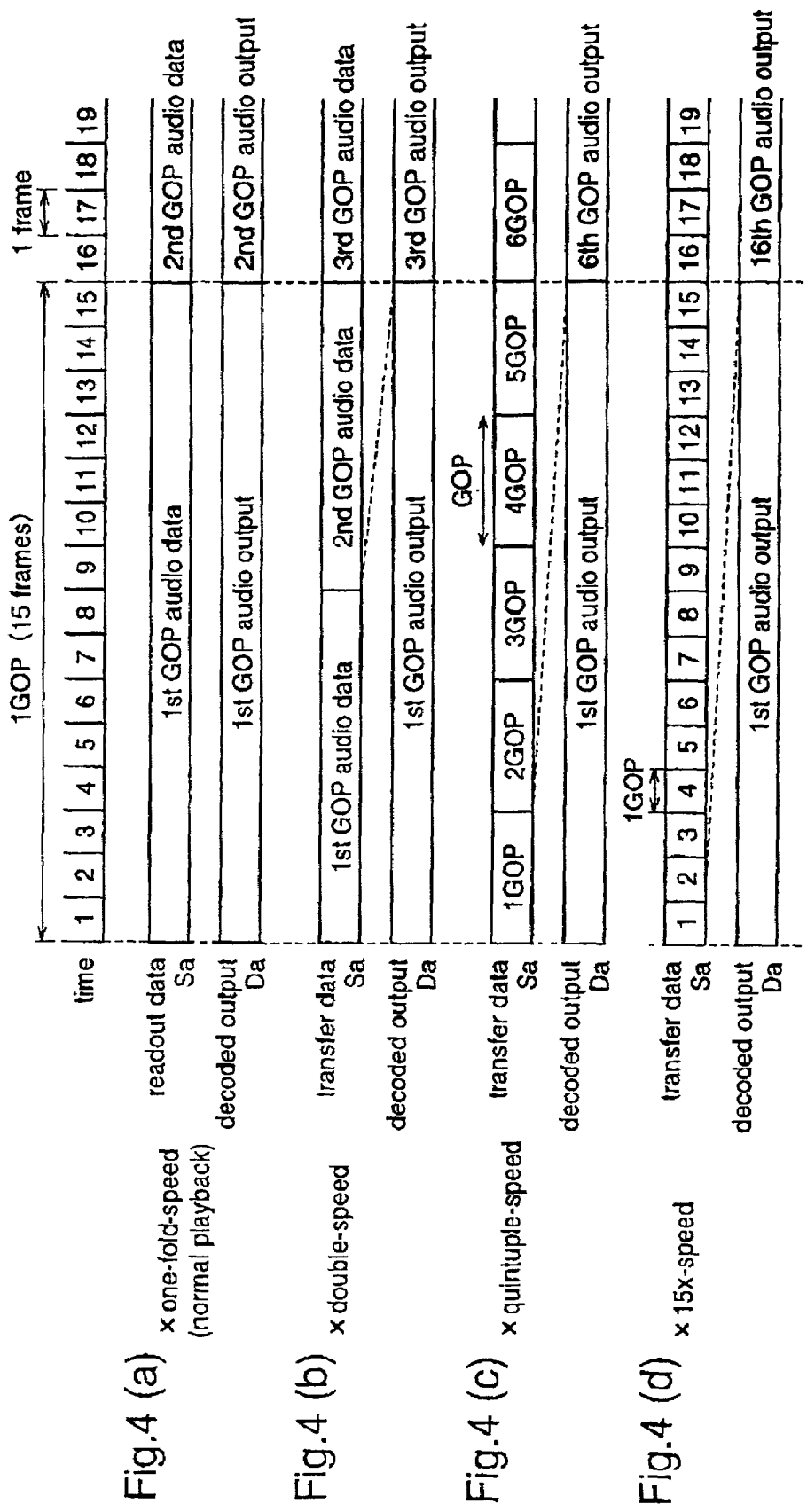
FIGS. 4(a) to 4(d) are diagrams for explaining decoding output processes of an audio stream by the decoder unit of the signal processing apparatus according to the first embodiment, and show target GOPs to be decoded and output in a normal playback mode (FIG. 4(a)), a double-speed dubbing mode (FIG. 4(b)) and high-speed dubbing modes (FIGS. 4(c) and 4(d)).

FIGS. 4(a)–4(d) are diagrams for explaining a decoding process for an audio stream by the audio decoder 123b, and these figures show the states where the audio stream is decoded in GOP units in the normal playback mode (FIG. 4(a)), the double-speed dubbing mode (FIG. 4(b)), and the high-speed dubbing modes (FIGS. 4(c) and 4(d)).

When the normal operation mode (first operation mode) is set, the video decoder 123a carries out the decoding process for all frames of the video stream (readout data) Sv from the system analysis unit 113, and generates the digital video data (decoded output) Dv, as shown in FIG. 3(a). In this case, the audio decoder 123b carries out the decoding process for all GOPs of the audio stream (readout data) Sa from the system analysis unit 113, and generates the digital audio data (decoded output) Da, as shown in FIG. 4(a). Here, FIG. 3(a) shows how the playback process, i.e., reading, transfer, decoding and display for the video stream corresponding to one GOP composed of 15 frames, is carried out in the period of 15 frames, and intra-frame coded data (video stream of I frame) are situated at the top of the GOP.

When the double-speed dubbing mode (second operation mode) and the IP image decoding mode a reset, the video decoder 123a outputs the digital video data (decoded output) Dv corresponding to 15 frames comprising only I frames and P frames among 30 frames composing two GOPs, by the decoding output process for the video stream (readout data) Sv from the system analysis unit 113, as shown in FIG. 3(b). Here, in the decoding output process in a case where the double-speed dubbing mode and the IP image decoding mode are set, a decoding process for the video stream is carried out for all I frames and P frames, and decoded digital video data (decoded output) of part of frames are discretely output. That is, the output digital video data correspond only to specific I frames and specific P frames. In this case, the audio decoder 123b carries out the decoding process for the audio stream (readout data) Sa from the system analysis unit 113 only for one of the consecutive two GOPs, and generates the digital audio data (decoded output) Da, as shown in FIG. 4(b).

When the quintuple-speed dubbing mode (third operation mode) and the IP image decoding mode are set, the video decoder 123a outputs the digital video data (decoded output) Dv corresponding to three frames including at least I frame among 15 frames composing each GOP, by the decoding output process for the video stream (readout data) Sv from the system analysis unit 113, as shown in FIG. 3(c). Here, in the decoding output process in a case where the quintuple-speed dubbing mode and the IP image decoding mode are set, the decoding process of the video stream is carried out for all I frames and P frames, and decoded digital video data (decoded output) of part of frames are discretely output. That is, the output digital video data correspond only to specific I frames and specific P frames. In this case, the audio decoder 123b carries out the decoding process for the audio stream (readout data) Sa from the system analysis unit 113 only for one of five consecutive GOPs, and generates the digital audio data (decoded output) Da, as shown in FIG. 4(c).

When the 15×-speed dubbing mode (fourth operation mode) and the I image decoding mode are set, the video decoder 123a outputs the digital video data (decoded output) Dv corresponding to one I frame among 15 frames composing each GOP, by the decoding output process for the video stream (readout data) Sv from the system analysis unit 113, as shown in FIG. 3(d). Here, in the decoding output process in a case where the 15×-speed dubbing mode and the I image decoding mode are set, the decoding process for the video stream is carried out for all I frames, and decoded digital video data (decoded output) of part of frames are discretely output. That is, the output digital video data correspond to only specific I frames. In this case, the audio decoder 123b carries out the decoding process for the audio stream (readout data) Sa from the system analysis unit 113 only for one of 15 consecutive GOPs, and generates digital audio data (decoded output) Da, as shown in FIG. 4(d).

In the signal processing apparatus 100 according to the first embodiment, the case is shown where the IP image decoding mode is set in the second or third operation mode. However, in these high-speed dubbing modes, the I image decoding mode can be set.

Further, in the fourth operation mode, the decoding output process for the video stream is carried out in frame units. However, the decoding output process for the video stream can be carried out in units of GOP (15 frames) as shown in FIG. 3(e). In this case, as for a GOP to be decoded and output, the decoding output process for the video stream is carried out for all frames composing this GOP.

Next, the operation will be described.

As described above, in the first storage device 101 of the signal processing apparatus 100, the multiplex bitstream including the video stream which is obtained by coding the digital video data by the variable rate coding method of MPEG is recorded. Here, the digital video data are variable-coded in a range of 1 Mbps to 10 Mbps. That is, the amount of codes generated per unit time at the coding of the digital video data varies in the range of 1 Mbps to 10 Mbps. Further, the average of the generated code amounts per unit time is 5 Mbps. Therefore, the average transfer rate of the video stream in the case where the multiplex bitstream is read from the first storage device 101 in the first operation mode (normal playback mode) is 5 Mbps.

Since an audio stream is included in the multiplex bitstream together with the video stream, the transfer rate of the multiplex bitstream in the normal playback mode is actually the one which is obtained by adding the average transfer rate of the video stream and the average transfer rate of the audio stream. However, the coding process for digital audio data is carried out at a fixed rate, and the amount of codes generated per unit time in the coding process for the digital audio data is extremely smaller than the amount of codes generated per unit time in the coding process for the digital video data. Therefore, to simplify the following description, the description will be given assuming that the average transfer rate of the video stream is the average transfer rate of the multiplex bitstream.

In the signal processing apparatus of the first embodiment, one of the first to fourth operation modes is initially set in accordance with the user operation Uos to the user operation unit 105. For example, when the operation signal Opb is output to the operation control unit 106 from the user operation unit 105 by the manipulation of the switch 105b, in the operation control unit 106 a prescribed one of the control signals Sc1~Scn is output to the data reading control unit 101a, the data writing control unit 102a and the decoder unit 103 or the like in accordance with the operation signal Opb. For example, in the video decoder 123a and the audio decoder 123b in the decoder unit 103, one of the first to fourth operation modes is set in accordance with the control signal Sch from the operation control unit 106.

Then, in the signal processing apparatus 100, according to the set operation mode, the playback of the video data and audio data on the basis of the MPEG multiplex bitstream stored in the first storage device, and the various types of high-speed dubbing of the multiplex bitstream are performed.

Hereinafter, the operation of the signal processing apparatus 100 of the first embodiment is specifically described in each of the operation modes, with reference to FIGS. 3(a) to 3(e) and FIGS. 4(a) to 4(d).

When the normal playback mode is set, in the signal processing apparatus 100, the multiplex bitstream is read from the first storage device 101 at the transfer rate of the normal playback in accordance with the control by the data reading control unit 101a. Then, in the decoder unit 103, the decoding process at the normal playback for the readout multiplex bitstream is carried out in accordance with the control by the operation control unit 106. In this normal playback mode, the operation control for the data writing control unit 102a and the auxiliary information generation circuit 104 by the data reading control unit 101a is not executed, and thereby the data writing control unit 102a and the auxiliary information generation circuit 104 do not operate.

To be more specific, in the system analysis unit 113 of the decoder unit 103, the header analysis of the multiplex bitstream is performed, and the video stream Sv and the audio stream Sa are separated from the multiplex bitstream. These video stream Sv and audio stream Sa are input to the video decoder 123a and the audio decoder 123b, respectively.

Then, in the video decoder 123a, the normal decoding process according to MPEG method including the intra decoding process and the inter decoding process is carried out for the readout data (video stream) Sv, as shown in FIG. 3(a). Then, from the video decoder 123a, the digital video data obtained by the decoding of the video stream are output as the decoded output Dv. In this decoded output Dv, the arrangement of I frames, P frames and B frames is the same as in the digital image data before carrying out the coding process as shown in FIG. 2(a).

In this case, in the audio decoder 123b, the normal decoding process according to MPEG method is carried out for the readout data (audio stream) Sa, as shown in FIG. 4(a). Then, from the audio decoder 123b, the digital audio data obtained by the decoding of the audio stream are output to the audio interface 133b as the decoded output Da. The digital audio data corresponding to the first GOP in the decoded output Da (first GOP audio output) corresponds to an audio stream corresponding to the first GOP in the readout data (first GOP audio data).

Then, when the digital video data (decoded output) Dv from the video decoder 123a are input to the video interface 133a, in the video interface 133a the DA conversion process for converting the digital video data (decoded output) Dv into the analog video signal Av and the like are carried out, and then the analog video signal Av is supplied to the video display unit (not shown) in the signal playback unit 120 via the output terminal 103b of the decoder unit 103. In the video display unit, the image is displayed by the playback process for the analog video signal Av.

On the other hand, when the digital audio data (decoded output) Da from the audio decoder 123b are input to the audio interface 133b, in the audio interface 133b the DA conversion process for converting the digital audio data (decoded output) Da into the analog audio signal Aa and the like are carried out, and then the analog audio signal Aa is supplied to the audio output unit (not shown) of the signal playback unit 120 via the output terminal 103c of the decoder unit 103. In the audio output unit, the audio is output by the playback process for the analog audio signal Aa.

In this way, in the normal playback mode, the reading of the multiplex bitstream from the first storage device 101, and the separation and decoding process for the video stream and audio stream are carried out, and then the playback of the digital video data and the digital audio data is performed. Here, the average transfer rate in the normal playback mode is 5 Mbps.

Next, the operation of the signal processing apparatus 100 in the dubbing mode is described.

When the double-speed dubbing mode is set, it is assumed that the reading of data from the first storage medium (HDD) of the first storage device, the transfer of data to the second storage device, and the writing of data onto the second storage medium (optical disk) of the second storage device are performed at 10 Mbps. All data stored in the first storage medium (i.e., video streams and audio streams of all frames) are input to the decoder unit 103, but since it is impossible to decode and play back all of the data (image display and audio output), the output process of decoded data obtained by the decoding process for the video streams and audio streams in the decoder unit 103 is carried out by performing thinning-out on the basis of a predetermined data unit.

To be more specific, when the double-speed dubbing mode is set, in the signal processing apparatus 100, the multiplex bitstream is read from the first storage medium of the first storage device 101 at a data transfer rate (double-speed data transfer rate) twice as high as the average data transfer rate at the normal playback, in accordance with the control by the data reading control unit 101a.

In the data writing control unit 102a, the data writing control for the second storage device 102 is executed in accordance with the control signal from the operation control unit 106, and in the second storage device 102 the multiplex bitstream read from the first storage medium of the first storage device 101 is written onto the second storage medium (optical disk) at the double-speed data transfer rate. Here, the double-speed data transfer rate is a rate for transferring data of 2 GOPs during the period of 15 frames.

In this double-speed dubbing mode, in parallel with this data transfer process, the decoding output process at the double-speed dubbing for the multiplex bitstream read from the first storage device 101 is carried out in the decoder unit 103, on the basis of the control signal from the operation control unit 106.

To be specific, in the system analysis unit 113 of the decoder unit 103, like in the case of the normal playback mode, the header analysis for the multiplex bitstream read from the first storage device is performed, and the video stream Sv and the audio stream Sa are separated from the multiplex bitstream. Then, the video stream Sv and the audio stream Sa are input to the video decoder 123a and the audio decoder 123b, respectively.

Then, in the video decoder 123a, the decoding output process at the double-speed dubbing including the intra decoding and the inter decoding is carried out for the readout data (video stream) Sv, as shown in FIG. 3(b).

To be specific, in this decoding output process, only the intra-frame coded frames (I frame) and the forward prediction inter-frame coded frames (P frames) are selected, and only video streams corresponding to I frames and P frames are decoded. Since when the decoding process for the bidirectional prediction inter-frame coded frames (B frames) is to be carried out, decoded data of reference frames which are forward and backward of the B frame are required and time is spent for this decoding process, it is desirable that the decoding process for the B frames is not be carried out in the double-speed dubbing mode.

Then, from the video decoder 123a, the digital video data obtained by the decoding of the video stream are output to the video interface 133a as decoded output Dv. In the arrangement of the decoded data in the decoded output Dv, the decoded data of I frame as the top frame data are followed by the decoded data of plural P frames in each GOP, as shown in FIG. 3(b). In addition, the decoded data of the I frame and predetermined P frames are output over the period of plural frames. Since the output of the decoded data is performed discretely, i.e., decoded data of a selected part of frames among I frames and P frames which have been subjected to the decoding process are output, the output state of the decode data of the selected frame is held (frozen) until the decoding process for the next selected frame is completed, whereby the display state is prevented from being interrupted.

Further in this case, in the audio decoder 123b, the decoding output process at the double-speed dubbing is carried out discretely for the readout data (audio stream) Sa, as shown in FIG. 4(b).

More specifically, in this case, the decoding process for the audio stream (readout data) Sa from the system analysis unit 113 is carried out only for one of two consecutive GOPs, as shown in FIG. 4(b), and the digital audio data (decoded output) Da are generated. In other words, after the decoding process for the audio stream is carried out continuously for one GOP period, the decoding process of the audio stream for one GOP period is skipped. Here, in the audio decoding output process at the double-speed dubbing, it is possible that the decoding process for the audio stream (readout data) Sa is carried out for all GOPs and the output of the decoded data is performed only for one of two consecutive GOPs.

Then, from the audio decoder 123b, the digital audio data obtained by the decoding of the audio stream are output to the audio interface 133b as the decoded output Da. The digital audio data corresponding to the first GOP (first GOP audio output) in the decoded output Da correspond to audio streams corresponding to the first and second GOPs (first GOP audio data and second GOP audio data) in the readout data.

The digital video data (decoded output) Dv from the video decoder 123a are converted into the analog video signal Av by the video interface 133a, and supplied to the video display unit (not shown) in the signal playback unit 120. In addition, the digital audio data (decoded output) Da from the audio decoder 123b are converted into the analog audio signal Aa by the audio interface 133b, and supplied to the audio output unit (not shown) in the signal playback unit 120.

Then, in the video display unit, the image display is performed by the playback process for the analog video signal Av, and in the audio output unit, the audio output is performed by the playback process for the analog audio signal Aa.

In this way, in the double-speed dubbing mode, the dubbing of the multiplex bitstream stored in the first storage device 101 is performed and the dubbing state is monitored.

Next, the operation of the signal processing apparatus 100 at the quintuple-speed or 15×-speed dubbing mode in which a much higher-speed dubbing process, as compared to the double-speed dubbing mode, is performed will be described.

The maximum transfer rate of the storage medium (hard disk) of the first storage device or the storage medium (optical disk) of the second storage device is not limited to 10 Mbps, and as for these storage media, the data access at a much higher transfer rate can be made. For example, when the data access at the transfer rate of 25 Mbps is possible, the data transfer rate at the dubbing is five times as high as the data transfer rate at the normal playback. When the data access at the transfer rate of 75 Mbps is possible, the data transfer rate at the dubbing is 15 times as high as that at the normal playback.

The signal processing apparatus 100 of this embodiment is constructed so as to include these high-speed dubbing modes.

The operation of the signal processing apparatus 100 in a case where the quintuple-speed dubbing mode is set is identical to the operation in the case where the double-speed dubbing mode is set except for the operation of the decoder unit 103.

To be more specific, in the system analysis unit 113 of the decoder unit 103, like in the case of the above-mentioned double-speed dubbing mode, the header analysis of the multiplex bitstream from the first storage device and the separation process of the video stream Sv and audio stream Sa from the multiplex bitstream are carried out.

In the video decoder 123a, the decoding output process at the quintuple-speed dubbing including the intra decoding and the inter decoding is carried out for the readout data (video stream) Sv, as shown in FIG. 3(c).

In this case, since data of 5 GOPs are transferred in the period of 15 frames as shown in FIG. 3(c), in the video decoder 123a the decoded data of the video stream corresponding to one to three frames are output for each GOP, by a decoding output process for the video stream. In addition, target frames to be decoded are I frames and P frames. Further, the decoded outputs (digital video data) Dv corresponding to the decoded frames are output for the period of three frames for each GOP. In this case, it is possible that each of the decoded outputs of three different frames is output for one frame period, respectively, or the decoded output of one frame is output for the period of plural frames.

The decoded output of the video stream is supplied to the video display unit of the signal playback unit 120 via the video interface 133a, as in the case of the double-speed dubbing mode.

In this case, in the audio decoder 123b, the decoding output process at the quintuple-speed dubbing is carried out for the readout data (audio stream) Sa, as shown in FIG. 4(c).

To be more specific, the decoding process for the audio stream (readout data) Sa from the system analysis unit 113 is carried out only for one of five consecutive GOPs, as shown in FIG. 4(c), and the digital audio data (decoded output) Da are generated. Here, in the audio decoding output process at the quintuple-speed dubbing, it is possible that the decoding process for the audio stream (readout data) Sa is carried out for all GOPs and the output of the decoded data is performed only for one of five consecutive GOPs.

The decoded output of the audio stream is supplied to the audio output unit of the signal playback unit 120 via the audio interface 133b, as in the case of the double-speed dubbing mode. For example, after the decoding process for the audio stream has been carried out continuously for one GOP period, the decoding process for the audio stream in the period of four GOPs is skipped and there after the decoding process of the audio stream for the sixth GOP is carried out.

In this way, in the quintuple-speed dubbing mode, the dubbing of the multiplex bitstream stored in the first storage device 101 is performed and the dubbing state is monitored.

The operation of the signal processing apparatus 100 in the case where the 15x-speed dubbing mode is set is identical to the operation in the case where the quintuple-speed dubbing mode is set, except for the operations of the video decoder 123a and the audio decoder 123b in the decoder unit 103.

In the video decoder 123a, as shown in FIG. 3(d), the decoding output process at the 15x-speed dubbing including the intra decoding and inter decoding is carried out for the readout data (video stream) Sv.

In this case, as shown in FIG. 3(d), data of 15 GOPs are transferred in the period of 15 frames. Therefore, in the video decoder 123a, the decoded data of the video stream corresponding to one frame are output for each GOP by the decoding output process for the video stream. In addition, target frames to be decoded are only I frames. Further, the decoded outputs (digital video data) Dv corresponding to the decoded frames are output only for one frame period for each GOP.

In this 15x-speed dubbing mode, it is not always required to carry out the decoding output process for outputting the decoded data corresponding to one frame for each GOP, but it is also possible that the decoding output process for outputting decoded data of one I frame is carried out for plural GOPs and at this time the decoded output (decoded data) of the I frame is output for the period of plural frames. In this case, the decoding and display of I frame is skipped.

The decoded output of the video stream is supplied to the video display unit of the signal playback unit 120 via the video interface 133a as in the case of the quintuple-speed dubbing mode.

In the audio decoder 123b, the decoding output process at the 15x-speed dubbing is carried out for the readout data (audio stream) Sa, as shown in FIG. 4(d).

To be more specific, the decoding process for the audio stream (readout data) Sa from the system analysis unit 113 is carried out only for one of 15 consecutive GOPs as shown in FIG. 4(d), and the digital audio data (decoded output) Da are generated. For example, after the decoding process for the audio stream is carried out continuously for the period of one GOP, the decoding process for the audio stream of the period of 14 GOPs is skipped and thereafter the decoding process for the audio stream corresponding to the 16th GOP is carried out.

In the audio decoding output process at the 15x-speed dubbing, it is possible that the decoding process for the audio stream (readout data) Sa is carried out for all GOPs and the output of the decoded data is performed only for one of 15 consecutive GOPs.

Then, the decoded output of the audio stream is supplied to the audio output unit in the signal playback unit 120 via the audio interface 133b as in the case of the quintuple-speed dubbing mode.

In this way, in the 15x-speed dubbing mode, the dubbing of the multiplex bitstream stored in the first storage device 101 is performed and the dubbing state is monitored.

In this dubbing mode, when the operation signal Opa is input from the user operation unit 105 to the auxiliary information generation circuit 104 by the manipulation of the switch 105a in the operation unit 105 by the user, in the auxiliary information generation circuit 104 the auxiliary information Ia indicating the writing address of the transfer data from the first storage device 101 to the second storage device 102 is generated, and the generated auxiliary information Ia is supplied to the data writing control unit 102a. Here, the writing address of the transfer data is an address at which the multiplex bitstream D output from the data reading control unit 101a is written on the storage medium (optical disk) of the second storage device 102.

In the data writing control unit 102a, when the auxiliary information Ia is input, the operation for controlling the second storage device so that the writing address of the transfer data at the manipulation of the switch 105a by the user is written to the management information storage area in the storage medium of the second storage device is executed on the basis of the auxiliary information.

As described above, the signal processing apparatus 100 of the first embodiment comprises the first and second storage devices 101 and 102 for storing the MPEG system stream as digital data; the data reading control unit 101a for controlling the reading of the system stream from the first storage device 101; the data writing control unit 102a for controlling the writing of the system stream read from the first storage device 101 onto the second storage device 102; and the decoder unit 103 for decoding the readout system stream, and at the dubbing of the system stream the decoder unit 103 carries out the decoding output process for the video stream and the audio stream of the system stream output from the data reading control unit 101a at a higher transfer rate than the transfer rate at the normal playback, and discretely outputs the decoded output of each stream. Therefore, the dubbing of the system stream can be performed with monitoring the dubbing state. Thereby, at the high-speed dubbing, the user can know the dubbing position in real time, whereby a marker (information indicating the position in the system stream) can be generated in real time at a data position or data time desired by the user.

Further, the signal processing apparatus 100 comprises the user operation unit 105 for generating an operation signal by the user operation and the operation control unit 106 for generating a predetermined control signal on the basis of the generated operation signal, and in the data reading control unit 101a, the data writing control unit 102a and the decoder unit 103, the operation corresponding to any of the normal playback mode, the double-speed dubbing mode, the quintuple-speed dubbing mode and the 15x-speed dubbing mode is executed in accordance with the control signal from the operation control unit 106. Therefore, the user can select the dubbing mode according to the circumstances of the user, for example, when the user wants to monitor the dubbing state in detail or when the user wants to perform the dubbing in a short time.

Further, in the signal processing apparatus 100 according to the first embodiment, when the user manipulates the switch of the user operation unit 105, the writing address of the transfer data (system stream) at the user manipulation is written to the management information storage area in the storage medium of the second storage device 102. Therefore, the management information of the beginning position of the data stored by the dubbing in the second storage device 102 can be created with monitoring the dubbing state.

Further, the user can add and store the auxiliary information such as the marker at the data position desired by the user in the dubbed data, only by the manipulation such as the press of the switch.

The auxiliary information as the writing address is generated, for example, as the marker, to be added to the data (system stream) of an important scene, whereby the beginning of the important scene can be easily found after the dubbing is performed. Further, the auxiliary information can be a marker for setting IN information (repeat start position) and OUT information (repeat end position) of a repeat section to be repeated at the playback of the dubbed data.

The positional information of data desired by the user can be stored in the second storage medium 102 such as the optical disk at the high-speed dubbing or at the completion of the dubbing, whereby the beginning of the important scene can be easily found at the playback of the data stored in the second storage medium 102 by utilizing the marker. Therefore, the method for writing the marker as the auxiliary information onto the second storage medium 102 is extremely useful.

In this first embodiment, as for the audio which is obtained by partially playing back the audio stream, it is desirable to perform the output of the playback audio of the respective parts approximately continuously without interruption. In addition, at the joints of playback audio of respective parts of the audio stream, it is desirable to carry out the processing such as muting for the playback audio over an infinitesimal section. Further, in the dubbing modes, it is also desirable to slightly lower the volume of the playback audio as a whole.

In this first embodiment, the decoding output process for the video stream is carried out in frame units in the fourth operation mode. However, the decoding output process for the video stream can be carried out in units of GOP (15 frames) as shown in FIG. 3(e). In this case, for the target GOP to be decoded and output, the decoding process of the video stream is carried out for all frames composing the GOP.

For example, the same decoding process as the decoding process of the video stream in the normal playback mode is carried out for 15 frames of the first GOP, the decoding process for the second to 15th GOPs is skipped, and thereafter the decoding process for the frames of the 16th GOP is carried out in the same way as the decoding process of the video stream in the normal playback mode. Thereby, the user can recognize intermittent but smooth images. Here, the period during which the same decoding process as the decoding process of the video stream in the normal playback mode is carried out for the plural consecutive frames is not limited to one GOP period, but a period shorter or longer than one GOP period may be possible.

In this first embodiment, as a method for thinning out the audio data, the method for discretely subjecting the audio stream to the decoding process is shown. However, a method for increasing the frequency of a clock as the basis of the decoding process, and decoding and outputting all data or the like is also conceivable.

Further, in this first embodiment, the method is shown for playing back coded digital audio data in a case where the target digital data to be dubbed which are stored in the first storage device include the mixture of the audio information and the video information. However, the target digital data to be dubbed can include only the audio information between the video information and the audio information.

In this case, in place of the unit shown in the first embodiment, i.e., GOP, units such as a predetermined audio frame unit, a unit indicating a predetermined time such as a second and the like, and a unit indicating a predetermined data amount such as 1 Mbit and the like can be adaptively used.

Further, in this first embodiment, the information indicating the position of a part desired by the user in the system stream is shown as the auxiliary information. However, this auxiliary information can be information indicating a storage time of the part desired by the user when the system stream is stored. In addition, the auxiliary information cannot only be stored during the dubbing, but also be stored collectively immediately after the completion of the dubbing.

Furthermore, in this first embodiment, the case is shown as an example where one GOP is composed of 15 frames in the MPEG coding method. However, the number of frames composing one GOP is not limited to 15.

In this first embodiment, as the average data transfer rates in the high-speed dubbing mode, the rates five times and 15 times as high as the average transfer rate in the normal playback mode are shown. However, the average data transfer rate in the high-speed dubbing mode can be a transfer rate other than these.

In this first embodiment, as the video stream, the video stream at a variable rate, in which the generated code amount per unit time generated at the coding of digital video data varies is shown. However, the coded digital video data can be the one at a fixed rate in which the generated code amount per unit time generated at the coding is fixed.

In this first embodiment, as the storage media in the first and second storage devices, the HDD and the optical disk are shown. However, the storage media are not limited to these disks, and can be magnetic disks, semiconductor memories or magnetic tapes, for example.

In this first embodiment, the auxiliary information is stored as the management information in a management area in the optical disk other than the data storage area in which the system stream is stored. However, the auxiliary information can be inserted into the system stream in real time.

In the operation by the user for generating the auxiliary information indicating a desired position in the system stream which is being dubbed, the timing when the user executes the operation for generating the auxiliary information is delayed by a prescribed time from a timing intended by the user when the desired position in the system stream which is being dubbed is stored. Therefore, as the marker set position information, in consideration of the prescribed delay time, it is desirable to compensate the storage position of the system stream at the operation of the user and generate the auxiliary information indicating the storage position of the system stream which was stored a predetermined time before the operation by the user. Here, it is desirable to set the compensation amount of the storage position of the system stream depending on the dubbing speed.

In this first embodiment, as the video stream in the system stream, the one including streams of I frames, P frames and B frames is shown. However, the video stream can include only streams of I frames and P frames, or only streams of I frames.

Further, in this first embodiment, the signal processing apparatus which contains the first and second storage devices 101 and 102, the data reading control unit 101a, the data writing control unit 102a, the decoder unit 103, the auxiliary information generation circuit 104, the user operation unit 105 and the operation control unit 106, in one apparatus body 100a is shown. However, the structure of the signal processing apparatus is not limited to this, and the respective elements can be contained in different device bodies and connected via predetermined interfaces, respectively.

Further, the first storage device 101 and the data reading control unit 101a can be mounted on a data transmission terminal device on the Internet, and the second storage device 102, the data writing control unit 102a, the decoder unit 103, the auxiliary information generation circuit 104 and the user operation unit 105 can be mounted on a data receiving terminal device on the Internet. In this case, each of the data transmission terminal device and the data receiving terminal device has a control unit corresponding to the operation control unit 106. Further, the decoder unit 103 can be mounted not on the data receiving terminal device, but the data transmission terminal device.

Further, in this first embodiment, in the decoding output process for the audio stream at the dubbing mode, the decoding of the audio stream is discretely performed in units of GOP. However, in the decoding output process for the audio stream, it is possible that the decoding of the audio stream is performed for all GOPs and the output process for outputting digital audio data obtained by the decoding is discretely performed in units of GOP.

Embodiment 2

Figure 5:
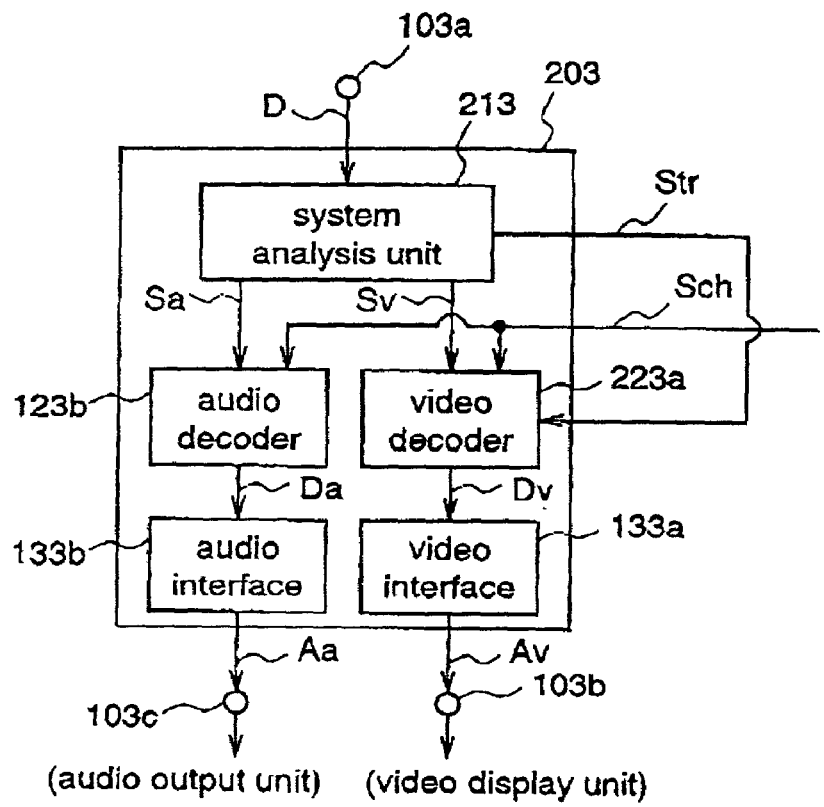
FIGS. 5(a) and 5(b) are diagrams for explaining a signal processing apparatus according to a second embodiment of the present invention.
Figure 5:
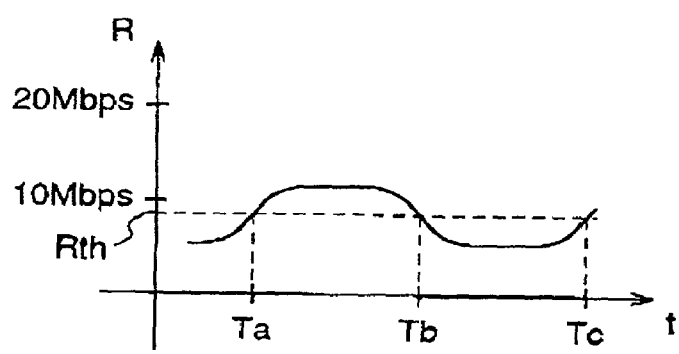
Figure 6:
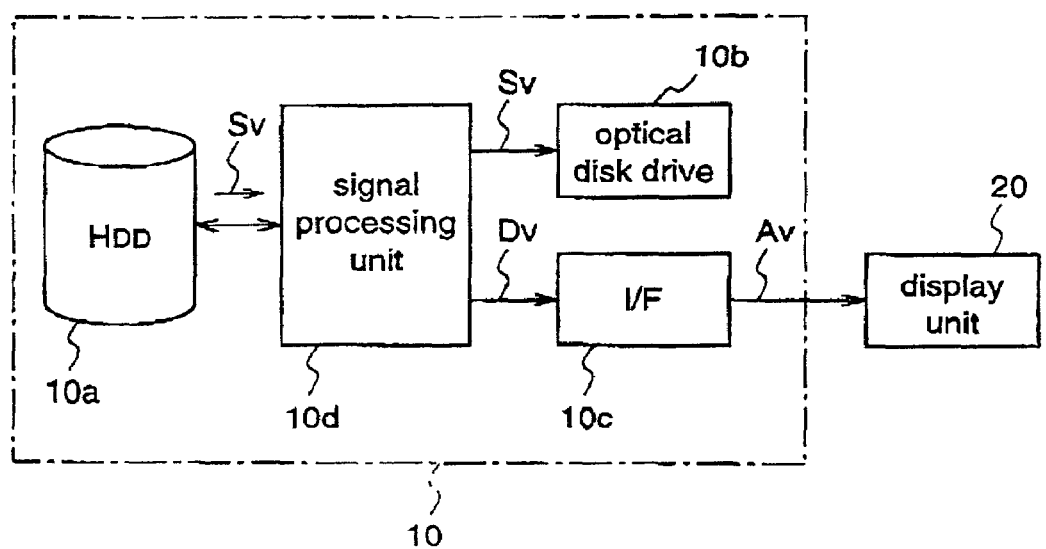
FIG. 6 is a block diagram for schematically illustrating a structure of a prior art record/playback apparatus.

FIGS. 5(a) and 5(b) are diagrams for explaining a signal processing apparatus according to the second embodiment. FIG. 5(a) shows a structure of a decoder unit in the signal processing apparatus and FIG. 5(b) shows how the operation mode of the decoder unit is switched.

The signal processing apparatus of the second embodiment has a decoder unit 203 in place of the decoder unit 103 in the signal processing apparatus 100 according to the first embodiment, for switching a mode of the decoding output process (decoding mode) for the video stream according to the changes in the code generation rate in the variable rate coding. Other structure of the signal processing apparatus is identical to the signal processing apparatus 100 of the first embodiment.

To be more specific, the decoder unit 203 of the signal processing apparatus according to the second embodiment comprises a system analysis unit 213 for analyzing the multiplex bitstream (system stream) D read from the first storage device 101, and separating and outputting the video stream Sv and the audio stream Sa from the multiplex bitstream, as well as outputting a code rate information Str indicating a generated code amount (coding rate) R per unit time in the video stream Sv, and a video decoder 223a for carrying out a video decoding process of decoding the video stream Sv output from the system analysis unit 213 on the basis of the analysis result, and outputting decoded data (digital video data) Dv obtained by the video decoding process. Here, the system analysis unit 213 detects the coding rate R from the information indicating the coding rate included in the GOP header.

Here, the video decoder 223a carries out the video decoding process in the dubbing mode (second or third operation mode) according to a decoding mode in accordance with the code rate information Str, selected from the I image decoding mode and IP image decoding mode on the basis of the code rate information Str from the system analysis unit 213. That is, the I image decoding mode is a decoding mode for carrying out only decoding processes for I frames on the basis of the video stream separated from the multiplex bitstream, and the IP image decoding mode is a decoding mode for carrying out only decoding processes for I frames and P frames on the basis of the video stream. In addition, the video decoder 223a selects the IP image decoding mode when the coding rate indicated by the code rate information Str is larger, and selects the I image decoding mode when the coding rate indicated by the code rate information Str is smaller.

The decoder unit 203 of the signal processing apparatus according to the second embodiment, as the decoder unit 103 of the first embodiment, has an audio decoder 123b for carrying out an audio decoding process of decoding the audio stream Sa output from the system analysis unit 213 on the basis of the analysis result and outputting decoded data (digital audio data) Da obtained by the audio decoding process, a video interface 133a for converting the digital video data Dv output from the video decoder 123a into an analog video signal Av and outputting the analog video signal Av to the output terminal 103b, and an audio interface 133b for converting the digital audio data Da output from the audio decoder 123b into an analog audio signal Aa and outputting the analog audio signal Aa to the output terminal 103c. The analog video signal Av output to the output terminal 103b is played back in the video display unit, and the image is displayed by the video display unit. The analog audio signal Aa output to the output terminal 103c is supplied to the audio output unit, and the playback audio is output from the audio output unit.

Next, the operation will be described.

The operation of the signal processing apparatus of the second embodiment is almost the same as the operation of the signal processing apparatus 100 of the first embodiment, except for the operation of the decoder unit 203. Therefore, in the following description, the operation of the decoder unit 203 is mainly described.

In the signal processing apparatus of the second embodiment, initially one of the first to fourth operation modes is set by the user operation Uos to the user operation unit 105. Then, in the signal processing apparatus, the playback of the video data and audio data stored in the first storage device 101 based on the MPEG multiplex bitstream, and the various types of high-speed dubbing of the multiplex bitstream are performed in accordance with the set operation mode.

To be brief, when the normal playback mode is set, in the signal processing apparatus of the second embodiment, the reading of the multiplex bitstream from the first storage device 101, the separation and decoding process for the video stream and audio stream, and the playback of the digital video data and digital audio data are carried out in a precisely identical way to the signal processing apparatus 100 of the first embodiment.

Then, when the double-speed, quintuple-speed or 15×-speed dubbing mode is set, in the system analysis unit 213, the multiplex bitstream (system stream) D read from the first storage device 101 is analyzed and the video stream Sv and the audio stream Sa are separated from the multiplex bitstream, then the code rate information Str indicating the generated code amount (coding rate) R per unit time in the video stream Sv is detected from the information indicating the coding rate included in the GOP header, and the code rate information Str is output to the video decoder 223a.

In the video decoder 223a, the decoding output process for the video stream separated from the multiplex bitstream is carried out on the basis of the code rate information Str.

To be more specific, in the video decoder 223a, when the coding rate R indicated by the code rate information Str is equal to or larger than a predetermined threshold Rth, the decoding output process for the video stream is carried out in the IP image decoding mode, and when the coding rate R indicated by the code rate information Str is smaller than the predetermined threshold Rth, the decoding output process for the video stream is carried out in the I image decoding mode (see FIG. 5(b)).

For example, when the coding rate R indicated by the code rate information Str varies as shown in FIG. 5(b), the coding rate R is equal to or larger than the predetermined threshold Rth in the period from time Ta to time Tb and during this period, the decoding output process in the IP image decoding mode is carried out for the video stream in the video decoder 223a. On the other hand, the coding rate R in the period from time Tb to time Tc is smaller than the predetermined threshold Rth and during this period, the decoding output process in the I image decoding mode is carried out for the video stream in the video decoder 223a.

The digital video data Dv obtained by the decoding output process for the video stream in the video decoder 223a are output via the video interface 113a as the analog video signal Av to the video display unit in the signal playback unit.

In parallel with the decoding output process for the video stream in the video decoder 223a, in the audio decoder 123b the decoding output process for the audio stream is carried out in the same way as in the decoder unit 103 of the first embodiment, and the digital audio data Da obtained by the decoding output process for the audio stream Sa are output via the audio interface 133b as the analog audio signal Aa to the audio output unit in the signal playback unit.

As described above, the signal processing apparatus of the second embodiment comprises the decoder unit 203 in place of the decoder unit 103 of the signal processing apparatus 100 of the first embodiment, for selecting the IP image decoding mode when the coding rate in the variable rate coding is larger and selecting the I image decoding mode when the coding rate indicated by the code rate information Str is smaller, during the dubbing of the multiplex bitstream (coded data). Therefore, when the coded data corresponding to a complex image are dubbed, the resolution per unit time of the image displayed as the monitor image of the dubbing state is increased, and when the coded data corresponding to an simple image are dubbed, the resolution per unit time of the image displayed as the monitor image is decreased. Thereby, during the dubbing of the coded data corresponding to a complex image, the image whose motion is smooth can be displayed as the monitor image, and for the simple image, the higher-speed dubbing for the coded data can be performed.

In the second embodiment, as a detection method of the coding rate R in the system analysis unit 213, the method for detecting the coding rate R from the information indicating the coding rate included in the GOP header is shown. However, the detection method of the coding rate R is not limited to this, and, for example, a method for detecting the coding rate R on the basis of the number of GOP headers detected per unit time can be also used.

In the first or second embodiment, the signal processing apparatus having the double-speed, quintuple-speed and 15×-speed dubbing mode as the dubbing modes and can set any of these dubbing modes is shown. However, the signal processing apparatus can have only one dubbing mode.

In any of the aforementioned embodiments, in the decoding output process in the case where the double-speed dubbing mode (or quintuple-speed dubbing mode) and the IP image decoding mode are set, the decoding process for the video stream is carried out for all I frames and P frames. However, in this decoding output process, it is also possible not to carry out the decoding process for I frames or P frames subsequent to a frame which is not displayed in the GOP. Conversely, when the decoder unit has a sufficient processing ability, in the decoding output process in the case where the double-speed dubbing mode (or quintuple-speed dubbing mode) and the IP image decoding mode are set, the decoding process can be carried out for not only I frames and P frames, but also B frames.

In the above-mentioned embodiments, in the decoding output process in the case where the 15×-speed dubbing mode and the I image decoding mode are set, the decoding process for the video stream is carried out for all I frames. However, in this decoding output process, it is also possible not to carry out the decoding process for I frames subsequent to a frame which is not displayed in the GOP. Conversely, when the decoder unit has a sufficient processing ability, in the decoding output process in the case where the 15×-speed dubbing mode and the I image decoding mode are set, the decoding process can be carried out for not only I frames, but also P frames and B frames.

Further, in the aforementioned embodiments, the case where one image sequence is composed of plural frames is shown. However, one image sequence can be composed of plural fields, and the fields can be handled as pictures composing one image sequence, like the frames.

What is claimed is:

1. A signal processing method for dubbing coded data including at least one of digital video information and digital audio information, the signal processing method comprising:
a first signal processing operation of reading the coded data from a first storage medium which contains the coded data at a second average transfer rate which is higher than a first average transfer rate for normal playback; and
a second signal processing operation of writing the coded data read from the first storage medium onto a second storage medium at the second average transfer rate, partially decoding the coded data, and outputting, while said writing of the coded data is progressing, decoded data corresponding to a portion of the coded data subjected to said writing.

2. The signal processing method of claim 1, wherein
the coded data are obtained by coding a digital video signal by a variable rate coding process in which a generated code amount per unit time varies with complexities of images, and
said outputting comprises outputting a digital video signal as the decoded data.

3. The signal processing method of claim 2, wherein
the variable rate coding process includes an intra-picture coding process for subjecting a target picture, as a frame or field to be coded, to a coding process for a digital video signal without referring to other pictures as other frames or fields, and an inter-picture prediction coding process for subjecting a target picture, as a frame or field to be coded, to a coding process for a digital video signal with referring to other pictures as other frames or fields, and
said outputting comprises discretely outputting, as the decoded data, a decoded video signal for at least a part of a plurality of pictures which have been subjected to the intra-picture coding process, the decoded video signal being obtained by said partially decoding, and holding an output state of a decoded video signal corresponding to one picture until a decoded video signal corresponding to a next picture is output.

4. The signal processing method of claim 2, wherein
the variable rate coding process includes an intra-picture coding process for subjecting a target picture, as a frame or field to be coded, to a coding process for a digital video signal without referring to other pictures as other frames or fields, and an inter-picture prediction coding process for subjecting a target picture, as a frame or field to be coded, to a coding process for a digital video signal with referring to a previous picture as another frame or field situated forward the target picture on a time axis, and said outputting comprises discretely outputting, as the decoded data, a decoded video signal for at least a part of a plurality of pictures which have been subjected to the intra-picture coding process or the inter-picture prediction coding process, the decoded video signal being obtained by said partially decoding, and holding an output state of a decoded video signal corresponding to one picture until a decoded video signal corresponding to a next picture is output.

5. The signal processing method of claim 4, wherein the second signal processing operation further comprises switching between subjecting only pictures which have been subjected to the intra-picture coding process to said partially decoding, and subjecting pictures which have been subjected to the intra-picture coding process or the inter-picture prediction coding process to said partially decoding, according to the generated code amount per unit time of the coded data.

6. The signal processing method of claim 2, wherein said partially decoding comprises partially decoding the coded data by taking at least one group of pictures including a plurality of pictures as frames or fields as a unit, and
said outputting comprises outputting decoded image signals, as the decoded data, corresponding to pictures composing at least one group of pictures as one continuous decoded video signal, and holding an output state of a decoded video signal corresponding to a last picture of the continuous decoded video signal until a decoded video signal corresponding to a first picture of a next continuous decoded video signal is output.

7. The signal processing method of claim 2, wherein the second average transfer rate is approximately equal to a maximum coding rate in the variable rate coding process, the variable rate coding process being an MPEG method.

8. The signal processing method of claim 2, wherein the second average transfer rate is a transfer rate which is higher than a maximum coding rate in the variable rate coding process, the variable rate coding process being an MPEG method.

9. The signal processing method of claim 1, wherein the coded data are obtained by coding a digital audio signal, and
said outputting comprises outputting a digital audio signal as the decoded data.

10. The signal processing method of claim 9, wherein said partially decoding comprises repeatedly carrying out an intermittent audio decoding process for executing the decoding process for the coded data for a first prescribed period and skipping the intermittent audio decoding process for the coded data for a second prescribed period following the first prescribed period, and
said outputting comprises repeatedly carrying out a data output process for outputting the decoded data during the first prescribed period and the following second prescribed period, with a digital audio signal obtained by the intermittent audio decoding process for the first prescribed period as a unit.

11. The signal processing method of claim 1, wherein the second signal processing operation further comprises generating auxiliary information indicating a data writing position at which the coded data are written onto the second storage medium in accordance with an operation signal generated by a user operation, and
said writing comprises writing the auxiliary information onto the second storage medium together with the coded data.

12. The signal processing method of claim 1, wherein the second signal processing operation further comprises generating positional information indicating a data writing position at which the coded data are written onto the second storage medium or time information indicating a data writing time corresponding to the data writing position, in accordance with an operation signal generated by user operation, and
storing the positional information or the time information as auxiliary information in a management information storage area in the second storage medium, in which management information of storage target data is stored.

13. The signal processing method of claim 12, wherein the second signal processing operation further comprises compensating the positional information indicating the data writing position at a user operation time or the time information indicating the data writing time so that the positional information indicates a previous data writing position at which said writing onto the second storage medium was performed a predetermined time before the user operation time, or the time information indicates a previous data writing time corresponding to the previous data writing position,
wherein said storing comprises storing the compensated positional information as the position information or the compensated time information as the time information in the second storage medium.

14. The signal processing method of claim 1, wherein the first storage medium is a hard disk, an optical disk, a magneto-optical disk, a semiconductor memory or a magnetic tape, and the second storage medium is a hard disk, an optical disk, a magneto-optical disk, a semiconductor memory or a magnetic tape.

15. A signal processing apparatus for dubbing coded data including at least one of digital video information and digital audio information at a second average transfer rate which is higher than a first average transfer rate for normal playback, the signal processing apparatus comprising:
a data writing unit for writing the coded data read at the second average transfer rate from a first storage medium containing the coded data, onto a second storage medium at the second average transfer rate; and
a decoder unit for partially decoding the coded data read at the second average transfer rate from the first storage medium and outputting, while said data writing unit writes the coded data, decoded data corresponding to a portion of the coded data, the portion being subject to the writing.

16. A signal processing apparatus for dubbing coded data including at least one of digital video information and digital audio information at a second average transfer rate which is higher than a first average transfer rate for normal playback, the signal processing apparatus comprising:
a data reading unit for reading the coded data from a first storage medium containing the coded data at the second average transfer rate; and
a data decoder unit for partially decoding of the coded data read from the first storage medium at the second average transfer rate, and outputting, while the coded data is being written, decoded data corresponding to a portion of the coded data, the portion being subject to the writing.

17. A signal processing method for dubbing coded data including digital audio information, the signal processing method comprising:
- a first signal processing operation of reading the coded data from a first storage medium which contains the coded data at a second average transfer rate which is higher than a first average transfer rate for normal playback; and
- a second signal processing operation of writing the coded data read from the first storage medium onto a second storage medium at the second average transfer rate, and decoding the read coded data by a clock having a frequency that is higher than a clock frequency for normal playback, to output decoded data corresponding to a portion of the coded data, the portion being subjected to said writing.

18. A signal processing method for dubbing coded data including at least one of digital video information and digital audio information, the signal processing met hod comprising:
- a first signal processing operation of carrying out a data reading process for reading the coded data obtained by coding a digital audio signal from a first storage medium which contains the coded data, at a second average transfer rate which is higher than a first average transfer rate for normal playback; and
- a second signal processing operation of carrying out a data writing process for writing the coded data read from the first storage medium onto a second storage medium at the second average transfer rate, carrying out a decoding process for decoding at least part of the coded data, and repeatedly carrying out a data output process for discretely outputting decoded data as a digital audio signal obtained by the decoding process so that the output of the decoded data is not interrupted, wherein
- said carrying out of the decoding process comprises repeatedly carrying out an intermittent audio decoding process for the coded data for a first prescribed period and skipping the intermittent audio decoding process for the coded data for a second prescribed period following the first prescribed period, and
- said repeatedly carrying out of the data output process comprises repeatedly carrying out a data output process for outputting the decoded data during the first prescribed period and the following second prescribed period, with a digital audio signal obtained by the decoding process for the first prescribed period as a unit.

19. A signal processing method for dubbing coded data including at least one of digital video information and digital audio information, the signal processing method comprising:
- a first signal processing operation of carrying out a data reading process for reading the coded data from a first storage medium which contains the coded data, at a second average transfer rate which is higher than a first average transfer rate for normal playback; and
- a second signal processing operation of carrying out a data writing process for writing the coded data read from the first storage medium onto a second storage medium at the second average transfer rate, carrying out a decoding process for decoding at least part of the coded data, repeatedly carrying out a data output process for discretely outputting decoded data obtained by the decoding process so that the output of the decoded data is not interrupted, generating positional information indicating a data writing position at which the coded data are written onto the second storage medium or time information indicating a data writing time corresponding to the data writing position, in accordance with an operation signal generated by a user operation, compensating the positional information indicating the data writing position at a user operation time or the time information indicating the data writing time so that the positional information indicates a previous data writing position at which the writing onto the second storage medium was performed a predetermined time before the user operation time, or the time information indicates a previous data writing time corresponding to the previous data writing position, and storing the compensated positional information or the compensated time information in the second storage medium.

* * * * *

UNITED STATES PATENT AND TRADEMARK OFFICE
CERTIFICATE OF CORRECTION

PATENT NO. : 7,013,077 B2 Page 1 of 1
APPLICATION NO. : 09/797823
DATED : March 14, 2006
INVENTOR(S) : Masahiro Honjo It is certified that error appears in the above-identified patent and that said Letters Patent is hereby corrected as shown below:

IN THE CLAIMS

In column 25, lines 49-50, please delete "executing the decoding process for".

In column 26, line 11, please replace "by user operation" with --by a user operation--.

In column 26, lines 61-62, please replace "decoding of the coded data" to --decoding the coded data--.

In column 27, line 19, replace "met hod" with --method--.

Signed and Sealed this

Twenty-second Day of August, 2006

JON W. DUDAS
*Director of the United States Patent and Trademark Office*